US011906390B2

(12) United States Patent
Koeping et al.

(10) Patent No.: US 11,906,390 B2
(45) Date of Patent: Feb. 20, 2024

(54) SYSTEM AND METHOD FOR BEARING DEFECT AUTO-DETECTION

(71) Applicant: Aktiebolaget SKF, Gothenburg (SE)

(72) Inventors: Lukas Koeping, Würzburg (DE); Allan Thomson, 8LX Lanark (GB)

(73) Assignee: Aktiebolaget SKF, Gothenburg (SE)

( * ) Notice: Subject to any disclaimer, the term of this patent is extended or adjusted under 35 U.S.C. 154(b) by 32 days.

(21) Appl. No.: 17/540,453

(22) Filed: Dec. 2, 2021

(65) Prior Publication Data
US 2023/0175925 A1 Jun. 8, 2023

(51) Int. Cl.
G01M 13/045 (2019.01)

(52) U.S. Cl.
CPC ................. G01M 13/045 (2013.01)

(58) Field of Classification Search
CPC .. G01M 13/045; G01M 13/028; G01M 17/08; F16C 2233/00; F16C 19/527; F16C 2326/10; G01H 1/003; G01H 9/00; G01H 1/10
See application file for complete search history.

(56) References Cited

U.S. PATENT DOCUMENTS

| 2008/0033695 A1* | 2/2008 | Sahara ................... G01H 1/003 702/185 |
| 2010/0145639 A1* | 6/2010 | Fu ........................... G01H 1/003 702/56 |
| 2017/0108406 A1* | 4/2017 | Thomson ............. G01M 13/045 |
| 2019/0332958 A1* | 10/2019 | Subhankar ............. G06N 20/00 |
| 2022/0057295 A1 | 2/2022 | Thomson |
| 2022/0057296 A1 | 2/2022 | Thomson |

FOREIGN PATENT DOCUMENTS

| CN | 110274764 A | * | 9/2019 | .......... G01M 13/045 |
| CN | 110487549 A | * | 11/2019 | |
| CN | 111610026 A | * | 9/2020 | .......... G01M 13/045 |
| CN | 112146882 A | * | 12/2020 | .......... G01M 13/045 |

* cited by examiner

Primary Examiner — Manuel A Rivera Vargas
(74) Attorney, Agent, or Firm — GARCIA-ZAMOR INTELLECTUAL PROPERTY LAW, LLC; Ruy Garcia-Zamor

(57) ABSTRACT

A method for performing bearing defect auto-detection provides an algorithm for processing condition monitoring data including vibration harmonics of at least one bearing coupled to a rotatable shaft, the bearing having an inner and an outer ring. The algorithm is used to confirm with high degree of confidence that a bearing defect is present or not.

23 Claims, 4 Drawing Sheets

SYSTEM AND METHOD FOR BEARING DEFECT AUTO-DETECTION

BACKGROUND

A train with all its axles fitted with the same axle-box design can have installed bearings from different manufacturers, which even though they have the same space envelope and "capacity" do often have differing bearing defect frequencies due to slight changes in their internal geometry. Managing which bearing is installed on which axle-box with for example, with @ptitude Observer (@O) manufactured by Aktiebolaget SKF with their principal place of business at 41550 Goteborg, Sweden and updating a database in a timely fashion is costly with respect to man-hours and prone to errors.

One type of system, manufactured by Aktiebolget SKF, with their principal place of business at 41550 Goteborg, Sweden, entitled "Insight Rail System" utilizes GPS linear speed and wheel diameter to determine the shaft rpm values for each measurement, however during the life of a rail wheel set the wheel profiles suffer from wear, dents, flats and fatigue squats (spalls) and therefore require reprofiling on condition or at regular intervals. The reprofiling is done by turning or grinding and each time reduces the diameter of the wheel (both wheels on the same axle are always kept at the same diameter) hence during the life of a wheelset its diameter is reduced generally by more than 10% with respect to when new. Managing individual axle wheel diameters, initial (on Insight installation) and after each reprofiling, and then updating the @ptitude Observer (@O) database in a timely fashion is costly with respect to man-hours and also prone to errors.

Often an Insight Rail system, manufactured by Aktiebolaget SKF is installed on a train whose bearings are part way through their service period hence the possibility exists that one or more bearings already have spalled to some degree, so it needs to detect bearing spalls without needing a learning period. Unlike @0 Protean systems manufactured by Aktiebolaget SKF, with their principal place of business at 41550 Goteborg, Sweden, which both require a "learning" period with a "healthy" bearing to establish trend characteristics and/or alarm thresholds.

SUMMARY OF THE INVENTION

According to one or more non-limiting embodiments, a method is provided to perform a bearing defect auto-detection. The method comprises receiving, by a processor from one or more sensors, condition monitoring data, the condition monitoring data including vibration harmonics of at least one bearing coupled to a rotatable shaft, the bearing having an inner and an outer ring, the method further including;

a) receiving the vibration data previously or sequentially transformed into the frequency domain and are ultimately provided as magnitude and frequency arrays, along with an approximate shaft speed in RPM or RPS, b) applying a peaks determination method that determines individual peaks from background noise, and the peak true amplitudes and their exact peak center frequencies, wherein the exact frequency and amplitude of each possible peak is stored into an array, c) identifying all feasible whole number sub-orders of each peak up to a predefined order number including the peak itself which fall into a specific range of target fundamental frequencies ranges, one for each defined defect type and storing those peaks along with their harmonic number and their theoretical fundamental as order arrays, d) clustering the theoretical fundamental frequencies that fall within each specific target range are clustered by one or more of many methods, the theoretical fundamental frequencies with a predefined cluster dimension limit and those clusters having acceptable clustering characteristics by number peaks in them and/or the tightest cluster dimensions are organized into groups and all others as outliers, and the groups stored in orders arrays, and e) Identifying all peaks from the original list that could be feasible sidebands components of the peaks identified in step (d), having a base delta frequency within specific range of target sideband frequencies ranges, one for each defined defect type, and up to a predefined sideband+/−delta orders to determine all feasible theoretical base delta sideband frequencies and storing those feasible sideband peaks along with the sideband number, the theoretical delta sideband frequency and the center peak ID index, that fall within each of the sideband target ranges as sideband arrays, and f) applying a clustering method to their base delta frequencies with a predefined cluster dimension limit and those clusters having acceptable clustering characteristics by number peaks in them and/or the tightest cluster dimensions is organized into sideband groups and all others as outliers, and the sideband groups stored in arrays with references to their respective center frequency peak from the orders arrays.

In a second aspect, the method may provide grouping patterns for each inner ring or outer ring bearing defect (or other defect types). Three factors for pattern construction are defined by 1) identifying the harmonics as a number of orders, 2) the number of sidebands, and 3) the fundamental frequency range and frequency range for the sidebands, wherein a fundamental component, none or a few harmonic components, none or a few sideband components having a delta frequency other than its fundamental comprise the possible grouped patterns.

In a third aspect, the method may provide determining condition indicators, wherein selecting the most feasible group can be then selected by (a) correlation with weighted pattern components, (b) presence or not of components (c) RSS of group components (d) pattern recognition method on each group.

In a fourth aspect, the method may provide identifying defects with a high confidence level, wherein defects can be predicted with a high degree of confidence by "Most-out-of-N" (MooN) principle. That is for each logic test, most of the results out of a test set of N measurements must be "positive," where the MooN logic parameters are defined by a) experienced analysts, b) by Design of Experiment (DOE) on known data, c) via machine learning. The use of an Artificial Intelligence algorithm to "Learn" the parameters, to identify which defects exist.

In further aspect, the method may provide the magnitude and frequency arrays are converted to an Enveloped Acceleration by a data acquisition system, and/or a Hanning window is performed on the data prior to the FFT, and/or an FFT or RFT is performed on data to generate spectral data, and/or the Magnitude of the FFT data is computed from the real and imaginary spectral components, "Magnitude"=SQRT(Real2+Imag2), and/or the spectrum is truncated.

In another aspect, the method may provide dividing each peak frequency at step c) by number from 1 to the number of harmonics to be included in turn to determine all sub-feasible theoretical fundamental frequencies.

In another aspect, the method may provide subtracting each peaks' frequency identified in step b) by every other peaks' frequencies in turn and dividing the absolute of the result by number 1 to the number of sidebands to search for to identify all feasible sideband peaks.

In another aspect, the method may provide optimizing groups by applying a method to remove groups from the group list which are a subgroup of another group having a lower or higher fundamental frequency, such as but not limited to (a) majority of the order peaks in the group are present as orders in another group of lower fundamental frequency, (b) the peaks' orders are all multiples of either one of 2, 3 or higher, (c) a majority of the first few orders of the fundamental need to exist as peaks typically 2 out of the first 3 or 3 out of the first 5 and so on.

In another aspect, the method may provide optimizing groups by applying a method to identify order peaks that are in more than one group, establish by one or more probability based rules or model assessing the relationship of the peak with respect to the other peaks in the group, which group it is most likely to be from and remove it from the other groups, such as but not limited to (a) the peak's specific fundamental frequency is closer to the mean of one groups fundamental frequency than the other, (b) the peak's order in one group is lower than the its order in the other.

In another aspect, the method may provide optimizing sides by applying a method to establish if each sideband peak is also a peak present in another group by one or more probability based rules or model such as but not limited to (a) the peak is a sideband component in one group and an order component in the other (b) the peak is positioned at a lower sideband Delta frequency multiple in one group than the other, (c) the sideband peak's base Delta frequency is closer to the mean of one group than the other group, (d) the sideband peak is part of a larger cluster in one group than the other.

In another aspect, the method may provide optimizing sides by applying a method to establish if each sideband peak within a group is likely to be genuinely linked to that group by one or more probability based rules or model such as but not limited to (a) on the presence or not of its center peak which is an order peak within the same group, (b) if Delta frequencies of the sideband group are all multiples the base Delta frequency of either one of 2, 3 or higher, then the sidebands belong to another base delta frequency and if outside of the defined sideband range or not deemed probable remove the sideband peaks from the group.

In another aspect, the method may provide selecting only the group having the (a) most peaks and/or (b) the narrowest cluster dimension (tolerance) and/or (c) best harmonic peak presence pattern, is selected as being representative of the most probable symptom related to that defined defect type and is stored as arrays of group components.

In another aspect, the method may provide selecting only the sideband group having the (a) most peaks and/or (b) the narrowest cluster dimension (tolerance) and/or (c) best sideband peak presence pattern, is selected as being representative of the most probable sidebands related to that specific defined defect type and is stored as arrays of sideband components associated with that specific group.

In another aspect, the method may provide applying a noise carpet filter to filter noise from of the frequency spectrum to remove unwanted spectral noise is accomplished by keeping only those components +10 dB above the local spectral carpet level, and wherein the rest are reduced to zeroes.

In another aspect, the method may provide identifying the peaks from the noise filtered spectrum and then a quadratic peak interpolation method is performed on the unfiltered spectrum, and it identifies the exact frequency as orders of presumed shaft speed and amplitude of each possible peak and stores them into an array. The result creates normalized arrays of Peak Frequencies and Peak Amplitudes.

In another aspect, the method may provide removing known mechanical frequency peaks using a module leaving a set of frequencies that include the bearing defect frequency components such as the inner and outer ring of the bearing. The mechanical peaks result from the test fixture such as shaft speed rather than the bearing, and wherein a "Funds in Band" sub-algorithm is called at least once in sequence to select array peaks that could have a sub-order and hence have a harmonic with a frequency within a specified frequency band.

In another aspect, the method may provide determining with the funds in band function if each peak itself or an exact sub-order of it falls within the frequency range of fundamental frequencies of interest (FunL→FunH) creating a new array of fundamentals, harmonic number and original indices. Those with their fundamentals that group together within a prespecified or learn tolerances are grouped as "orders" for that specific fundamental. Then a Sides in Band function is applied and for the selected group(s) for each order in that group each possible peak in the original array is checked to see if its delta-frequency wrt that order is or has a sub-order within the sideband range.

In another aspect, the method may provide determining the learned tolerances with artificial.

In another aspect, the method may provide associating with the clustering orders sub-algorithm which frequency members belong within a frequency group, wherein a dimensional cluster method performs removal of outsiders from the group, wherein the groupings by specific tolerances can be achieved by (i) histograms of reducing bin sizes for one or more groups, (ii) clustering of reducing size by removal of outsiders for a single group, (iii) multiple clusters for multiple groups, and wherein the outputs of Cluster-orders and/or Remove-Subs sub-algorithms are arrays of individual order components sorted into identifiable groups(s).

In another aspect, the method may provide the search range for the fundamental frequency being for a first iteration centered around the expected frequency of a known mechanical vibration component and utilizing a low number of harmonics, then by clustering the results the most feasible cluster is used to calculate a significantly narrower search range and the number of harmonics increased for a second iteration, from which with or without the option of further clustering the identified peaks are removed from the peaks arrays prior to iterating claim 1 for defect frequencies.

In another aspect, the method may provide the test for ignore sides including a) the group has at least 2 "first" sideband components, and/or b) the group has at least 1 "first" sideband component AND 2 "second" sideband components. The outputs of ClusterSides and/or IgnoreSides functions are arrays of individual sideband components sorted into the same group(s) of the order component which is their "center-frequency.

In another aspect, the method may provide each component in the pattern being weighted according to two sets of weighting coefficients; one for the harmonics (orders) and one for the sidebands statistically derived as to determine the most probable defect type and these weightings being static algorithm parameters.

In another aspect, the method may provide the Most-out-of-N principle is a probabilistic sub-algorithm that is used to confirm with high degree of confidence that a bearing defect is present or not, wherein the required measurement values/parameters for the latest N measurements comprise 1) Bearing Defect Frequency Types, 2) Bearing Defect Frequency Value 1 to N, 3) Bearing Defect Fundamental Frequency Value 1 to N, 4) Bearing Defect Sideband Frequency Value 1 to N, and 5) Rotations per Minute 1 to N.

According to one or more non-limiting embodiments, Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION OF THE INVENTION

Embodiments herein relate to a functionality for a proposed method for Auto Detection of bearing spall defects on railway axle-box bearings without the need to know the exact bearing designation (or defect frequencies) or have accurate shaft speed. The method includes "Reverse Sweeping" and outputs for multiple identified patterns are disclosed. With the right parameters the algorithm is applicable to rail monitoring systems and other industries not knowing the exact bearing designation (or defect frequencies) or have accurate shaft speed. A sub-algorithm or module typically includes software that executes a specific instruction set. However, one skilled in the art will recognize that a specific instruction set may also be performed by hardware or a combination of software and hardware.

The word "method" is used to describe the implementation of various functions throughout this paper. A method may provide a number of different ways to carry out the intended function and are not meant to be limiting.

Figure 1:
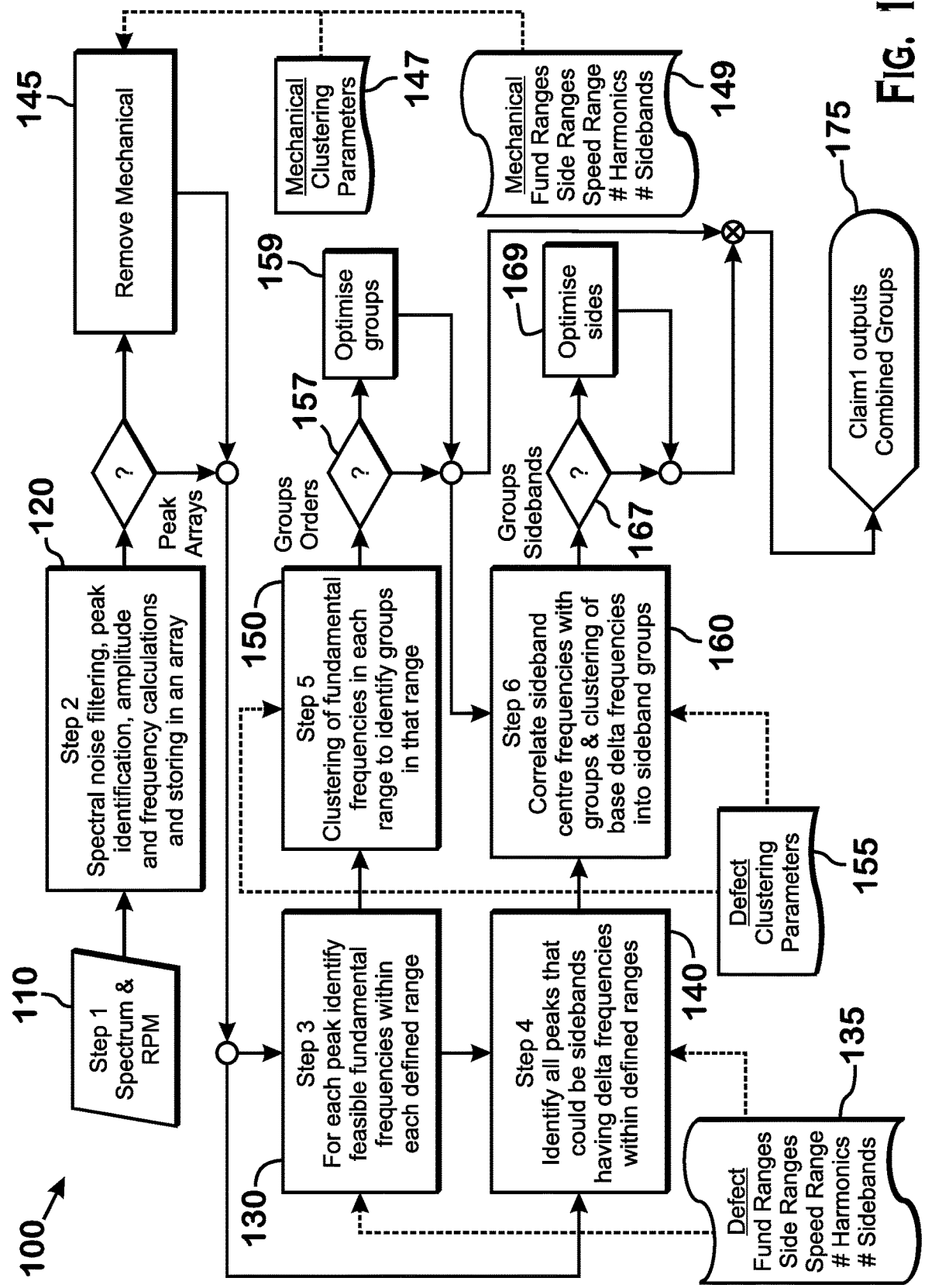
FIG. 1 depicts a flow diagram illustrating an example core algorithm in accordance with one or more embodiments of the present invention.

FIG. 1 depicts a flow diagram illustrating an algorithm 100 that frameworks the functionality for a proposed method for Auto-Detection of bearing spall defects on railway axle-box bearings without the need to know the exact bearing designation or defect frequencies) or have accurate shaft speed. The Auto-Detection algorithm may be executed on a processor 102 (see FIG. 2) or other computer framework comprising and/or employing any number and combination of computing device and networks utilizing various communication technologies, as described herein. The computer framework can be easily scalable, extensible, and modular, with the ability to change to different services or reconfigure some features independently of others. The algorithm may be a computer executable program or computer executable product.

Figure 2:
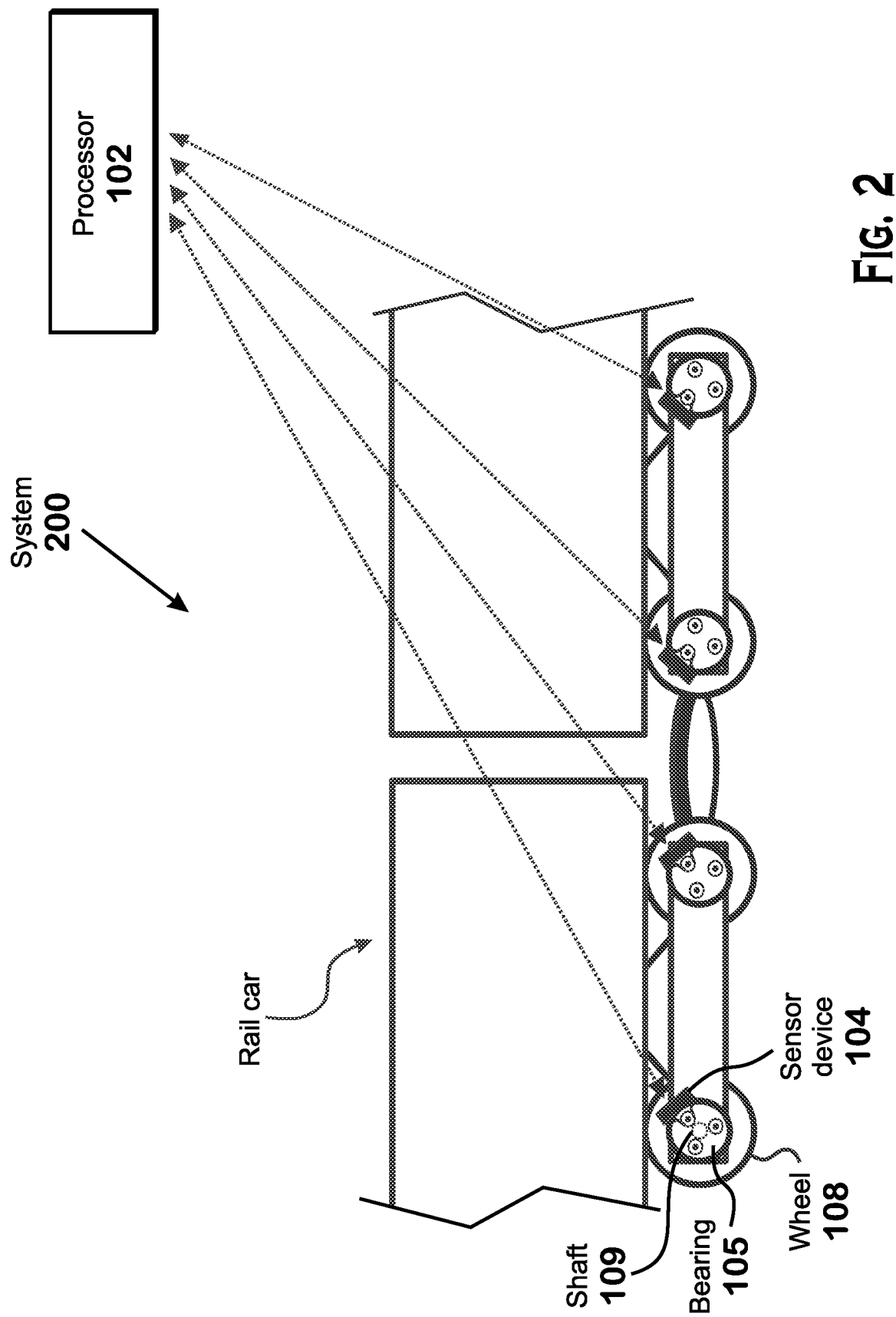
FIG. 2 depicts a schematic diagram of a basic system for carrying out the function of the proposed core algorithm in accordance with one or more embodiments.

FIG. 2 depicts a schematic diagram of a basic system 200 for carrying out the function of the proposed method that includes a processor 102 and one or more sensors 104 connected to at least one bearing 106 mounted upon a rail wheel set 108.

In a sub-algorithm module 110, condition monitoring data including vibration harmonics of the at least one bearing 105 coupled to a rotatable shaft 109 are received by the processor 102. The vibration data, previously or sequentially transformed into the frequency domain are processed into magnitude and frequency arrays. This includes an approximate shaft speed in RPM or RPS.

In a sub-algorithm module 120, a peaks determination sub-algorithm/module is applied. The peaks determination sub-algorithm determines individual peaks from background noise, and the peak true amplitudes and their exact peak center frequencies. The exact frequency and amplitude of each possible peak is stored into an array. Here, each peaks' frequency identified is divided by every other peaks' frequencies in turn. The absolute value of the result is divided by number 1 to the number of sidebands to search for in order to identify all feasible sideband peaks.

Whatever format the condition monitoring data is supplied in, it often is converted to an Enveloped Acceleration which is normally done by an acquisition system and then into a Spectrum preferably with Peak-to-Peak scaling and using the Hanning window prior to an FFT. The FFT results are converted to "Magnitude" and the spectrum truncated to Number Bins and with a spectral FMax of (waveform sample rate sps)/2.56. For example, a waveform having 4096 samples acquired at 2560 sps will produce a spectrum of 1601 bins (including the Zero bin) with a FMax of 1000 Hz (last bin).

To improve identification of spectral peaks, it is advantageous to Zero all spectral components considered to be in or close to the noise carpet and only keep those significantly above the carpet for the pattern sweep correlation. A filter threshold 10 dB and above yields good results for removing unwanted noise. Here, a module for calculating the local carpet level and removing the "noise" components for the noise filtered spectrum is provided. This is achieved by going through the spectrum bin by bin, calculating the median using a number of bins either side of that specific bin corresponding to + and $-\frac{1}{32}$ of the number of spectral bins. If that specific bin has a value greater or equal to the median plus 10 dB (or median*3.16) its value is kept otherwise its value is zero.

For every NON-ZERO bin value in the noise FILTERED spectrum it is necessary to determine if it or within a bin spacing is representative of a "Peak" and calculate its exact frequency and amplitude by the Quadratic Peak Identification/Interpolation method using the UN-FILTERED spectrum to create arrays of (a) Peak Frequencies (PkHz) and (b) Peak Amplitudes (PkMags).

In a sub-algorithm module 130, all feasible whole number sub-orders of each peak up to a predefined order number including the peak itself that fall into a specific range of target fundamental frequencies ranges are identified. Here, each peak frequency is divided by a number from 1 to the number of harmonics to be included in turn to determine all subfeasible theoretical fundamental frequencies. One for each defined defect type are identified. The peaks are stored along with their harmonic number and their theoretical fundamental as orders arrays.

Parameters regarding the characteristics of defects 135 are stored in a separate database and may be accessed by sub-algorithm module 130. The defect information is related to each defect type defined, such as BPFO Ball (roller) Pass Frequency Outer-race and BPFI Ball (roller) Pass Frequency Inner-race.

Defect Fundamental frequency as order of running speed is defect specific. Examples may be 6.23 and 11.34, etc. A default/typical defect fundamental range as +/−% is <1% to 33%. A default/typical defect sideband base delta frequency as an order of running speed is 037, 1.0 etc. In addition, a default/typical defect sideband range as +/−% is <1 to 33. Also, a default/typical Orders of Fundamental (harmonics) range to include 3 to 100+. Finally, a default/typical Number of Sidebands to (either side) include is 0 to 10. As such, all of the defect information disclosed in this paragraph are accessed by the sub-algorithm module 130 in order to identify the defects.

In a sub-algorithm module 140, all peaks from the original list that may be feasible sidebands components of the peaks identified in subalgorithm module 130 are identified. The peaks that could be feasible sideband components are identified by those having a base delta frequency within specific range of target sideband frequencies ranges, one for each defined defect type, and up to a predefined sideband+/−delta orders to determine all feasible theoretical base delta sideband frequencies and storing those feasible sideband peaks along with the sideband number. The theoretical delta sideband frequency and the center peak ID index, that fall within each of the sideband target ranges are stored as sideband arrays. All of the characteristics regarding defects 135 disclosed in this paragraph may be accessed by the sub-algorithm module 140 in order to identify the feasible peaks.

In a sub-algorithm module 145 a remove mechanical function is performed to remove mechanical noise. This option is used to remove wheel noise components slotted between the Peak Arrays module 120 and the Fundamental peak processing modules 130 and 140. Only the group having the (a) most peaks and/or (b) a narrowest cluster dimension (tolerance) and/or (c) best harmonic peak presence pattern, is selected as being representative of the most probable symptom related to that defined defect type and is stored as arrays of group components. The remove mechanical function can be manually "enabled" or "disabled" or even be made to be dependent on the amount of wheel noise activity present.

The remove mechanical function 145 option obtains input from databases that contain parameters and characteristics which are common to all mechanical noise. A first input is received from a mechanical clustering parameters 147 module. In the mechanical clustering parameters 147 module, a default/typical range for the smallest acceptable cluster size in number of peaks lies in a range between 2-5. The mechanical order clustering limits as orders of running speed for a first iteration is approximately 0.01 Note: This default/typical range may vary in value and definition depending on clustering method used as many types of clustering methods could be used such as DBSCAN, OPTICS, Gaussian Mixture etc. The mechanical order clustering limits as orders of running speed for second iteration is for "distance between nearest points" approximately 0.006. The second iteration default/typical range man also vary in value and definition depending on clustering method used. The mechanical sideband clustering limits as orders of running speed is approximately 0.01. The default/typical range may vary in value and definition depending on clustering method used.

A second input into the remove mechanical function 145 is received from a second remove mechanical 149 module. Here, a default/typical mechanical fundamental frequency as an order of running speed or shaft speed is 1. A default/typical defect fundamental range as +/−% is <1% to 33%. A default/typical defect sideband base delta frequency as an order of running speed is 037, 1.0, etc. In addition, A default/typical defect sideband range as +/−% is <1 to 33. A default/typical Orders of Fundamental harmonics range to include in a first iteration is 3 to 11. Further, A default/typical Orders of Fundamental harmonics range to include in a second iteration is 0 or up to 100+. Finally, A default/typical Number of Sidebands to (either side) include is 0 to 10. As such, all of the defect information disclosed in this paragraph are accessed by the remove mechanical function 145 in order to identify the mechanical defects.

In a sub-algorithm module 150, the peaks which have theoretical fundamental frequencies that fall within each specific target range are clustered by one or more of many methods. The theoretical fundamental frequencies with a predefined cluster dimension limit and those clusters having more than a predefined number peaks in them are organized into groups and all others as outliers, and the groups stored in orders arrays. A "group" within a measurement consists of spectral components (identified peaks) linked by either being near exact orders of a fundamental within the fundamental range of interest be it one of the peaks or theoretical and other spectral components all having a delta frequency to an "order" being near exactly the same and within the sideband range of interest.

In a sub-algorithm module 155, defect clustering parameters common to all of the defects defined are stored in a separate database and may be accessed by sub-algorithm module 150. A smallest acceptable cluster size in number of peaks is in a range between 2-5. Defect orders clustering limits as orders of running speed are approximately 0.005. Defect sideband clustering limits as orders of running speed are approximately 0.01. All of the characteristics regarding defect clustering parameters 155 disclosed in this paragraph, may be accessed by the sub-algorithm module 150 in order to identify the feasible peaks.

In a sub-algorithm module 157, a decision between forwarding the groups orders may or may not be optimized. If the groups orders are to be optimized in sub-algorithm module 159, only the groups having the (a) most peaks and/or (b) the narrowest cluster dimension (tolerance) and/or (c) best harmonic peak presence pattern, is selected as being representative of the most probable symptom related to that defined defect type and is stored as arrays of group components.

During optimization in sub-algorithm module 159 unwanted groups are removed from a potential group list stored in the arrays are removed. The groups to be removed are typically a subgroup of another group having a lower or higher fundamental frequency, such as but not limited to (a) majority of the order peaks in the group are present as orders in another group of lower fundamental frequency, (b) the peaks' orders are all multiples of either one of 2, 3 or higher, (c) a majority of the first few orders of the fundamental need to exist as peaks typically 2 out of the first 3 or 3 out of the first 5, etc.

In addition, during groups optimization 159 the order peaks that are in more than one group are identified. This is determined by one or more probability-based rules or model assessing the relationship of the peak with respect to the other peaks in the group, which group it is most likely to be from and remove it from the other groups. This includes but is not limited to if (a) the peak's specific fundamental frequency is closer to the mean of one groups fundamental frequency than the other, if (b) the peak's order in one group is lower than its order in the other.

In sub-algorithm module 160, it is determined which of the sidebands from the sideband arrays are related to center frequencies components that are present in a group components array and have delta sideband frequencies within the target sideband frequency range for that group defect definition. A clustering sub-algorithm is applied to their base delta frequencies with a predefined cluster dimension limit. Those clusters having more than a predefined number sidebands peaks in them are organized into sideband groups and all others as outliers. The sideband groups are stored in arrays with references to their respective center frequency peak from the orders arrays. All of the characteristics regarding defect clustering parameters 155 disclosed above, which are stored in a separate database are accessed by the sub-algorithm module 160 in order to identify the feasible peaks.

In a sub-algorithm module 167, a decision between forwarding the groups sidebands may or may not be optimized. If the groups sidebands are to be optimized in sub-algorithm module 169, only the sideband group having the (a) most peaks and/or (b) the narrowest cluster dimension (tolerance) and/or (c) best sideband peak presence pattern, is selected as being representative of the most probable sidebands related to that specific defined defect type and is stored as arrays of sideband components associated with that specific group.

During optimization 169, it is determined whether each sideband peak is also a peak present in another group by one or more probability-based rules or model. The rules include but not limited to (a) the peak is a sideband component in one group and an order component in the other (b) the peak is positioned at a lower sideband Delta frequency multiple in one group than the other, (c) the sideband peak's base Delta frequency is closer to the mean of one group than the other group, (d) the sideband peak is part of a larger cluster in one group than the other.

In addition, during sideband optimization it is determined if each sideband peak within a group is likely to be genuinely linked to that group by one or more probability-based rules or model. The rules include but not limited to (a) on the presence or not of its center peak, which is an order peak within the same group, (b) if Delta frequencies of the sideband group are all multiples the base Delta frequency of either one of 2, 3 or higher, then the sidebands belong to another base delta frequency and if out of the defined sideband range or not deemed probable, remove the sideband peaks from the group.

After both the groups' orders are optimized 159 and the group sidebands are optimized 169 (or not) in their respective sub-algorithm modules, the two outputs are combined into one output containing the combined groups shown in a subalgorithm module 175. The output of the combined optimized groups provides one skilled in the art the necessary information in order to automatically detect bearing defects. That is, the core algorithm provides one the ability to separate the wheat from the chaff so to speak by providing patterns of linked spectral components from within each defined range of interest. At this point in the disclosure, the core function of the present invention has been disclosed.

Figure 3:
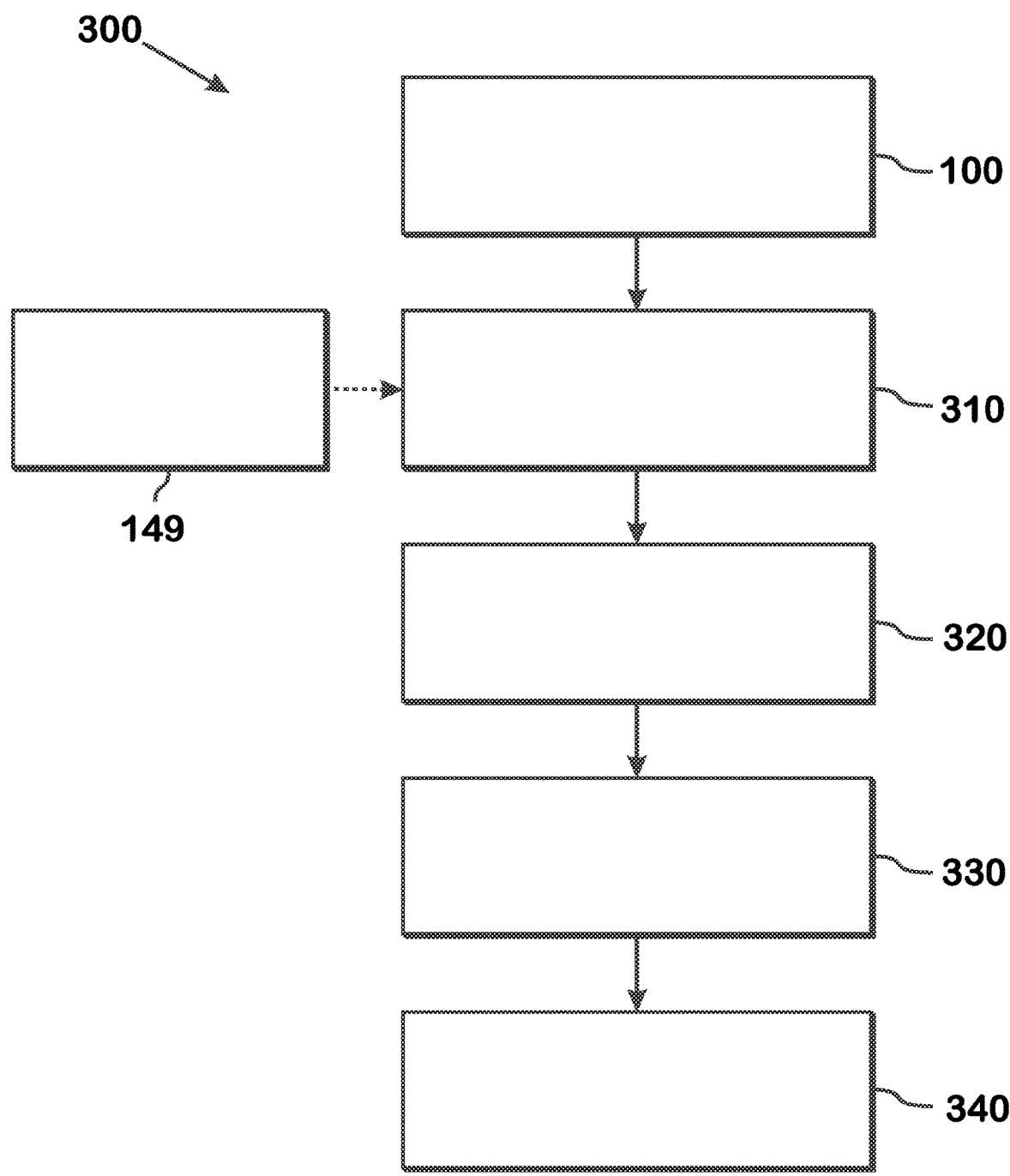
FIG. 3 depicts a flow diagram of one application of the present invention.
Figure 4:
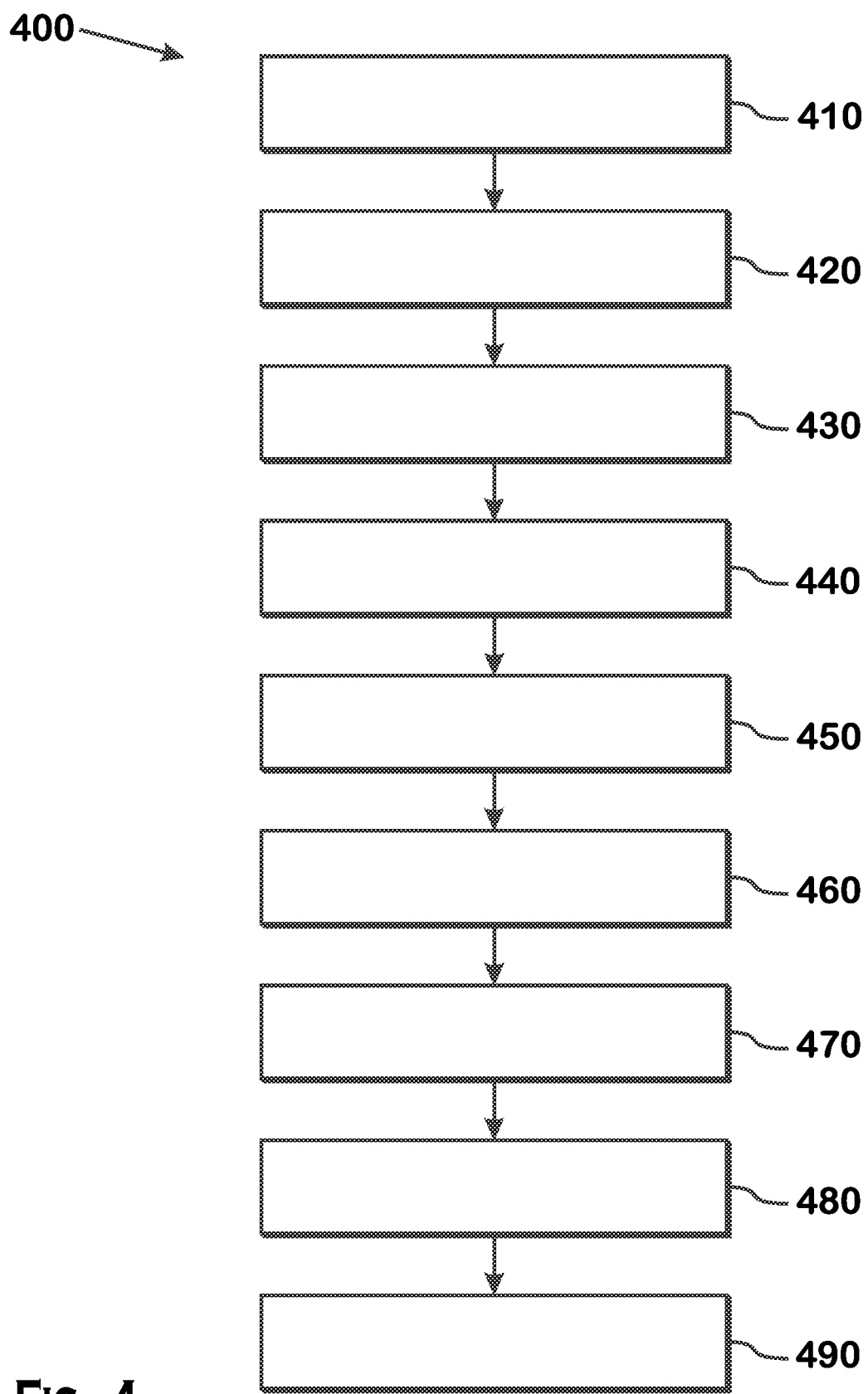
FIG. 4 depicts a process flow of the method steps required to carry out the function of the algorithm according to the present invention.

Some applications of the core algorithm 100 will now be disclosed. FIG. 3 depicts an application 300 of the core algorithm 100. FIG. 3 illustrates the output of the core algorithm being fed into sub-algorithm module 310. In sub-algorithm module 310, the pattern correlation values are grouped.

In module 305, the pattern weightings are fed into sub-algorithm module 310. Here, for each bearing defect and for each mechanical symptom a pattern is created having a fundamental component, none or a few harmonic components (orders 2, 3, etc. of fundamental) and none or a few sideband components having a delta frequency other than its fundamental (generally another fundamental). For the bearing patterns three factors need to be defined;

the harmonics as number of orders (including the fundamental);

The number of sidebands; and

The defect frequency or mechanical frequency identifier for the sidebands.

The patterns' individual weightings are derived by: Component weighting=order #weighting*sideband #weighting. So a 3rd order of the fundamental 2nd sideband would be=0.8*0.9=0.72 and so on. Then depending on number of harmonics and/or sidebands the pattern's weightings are then normalized as not to favor the patterns with more components by;

Weightings Normalized=(Weightings in pattern)/SQRT (RSS(Weightings in pattern)). Here the RSS is Root Sum Squared value.

Each component in the pattern is weighted according to two sets of weighting coefficients, one for the harmonics (orders) and one for the sidebands. These coefficients remain constant regardless of the application.

In sub-algorithm module 320, a Moon (Most out of N) based system is used to determine whether a bearing defect is present or not. This requires that a least the N most recent measurements are kept within a FIFO buffer OR all of them within a database that the logic function of the module can access.

In sub-algorithm module 330, the Most-out-of-N(MooN) logic concept considers at least 3 tiers of conditions to be met proving defect symptom consistency in most out of the last N measurements prior to raising a detection. For many applications with random presence of noise this MooN method be it for an alarm hysteresis logic-rules approach has proved to be invaluable in obtaining decent detection reliability.

One approach is to hard code the MooN logic or thresholds such as;

Presence of orders in first three orders.

Presence of sidebands;

rss of group components or pob (percentage of band=rss (group)/rss(band)*100);

Consistency of the fundamental frequency between sequential measurements

Consistency of sidebands being present or not between sequential measurements Consistency of the sideband delta frequency between sequential measurements.

In the final sub-algorithm module 340, a RatioStats function is considered to determine how many of the supplied frequency ratios for both the Fundamentals and Sidebands (if present) have a statistical distribution within the RFthresh limits. Firstly, the fundamental ratios are assessed then of those found to be within the threshold limits the sideband frequency ratios if present are assessed. Various assessment options have been tested and all work but they have not been tested on enough data to establish which is more reliable.

Option A; Range+/−from mean as percentage of mean
Option B; Range+/−from median as percentage of median
Option C; clustering methods such as DBSCAN, OPTICS, Gaussian Mixture, etc
Option D; A statistical value (i.e. standard deviation) etc. For the purpose of this document and as it was the original starting point option A is described below. The methodology is to first assess the fundamental frequency ratio ranges of all the samples provided, if the result is outside the limit provided than remove the "outsider" and reassess and repeat until the result is within the limit, if this number of measurements is greater than N/2 then for those measurements only (and if sidebands are present) repeat for the Sideband frequency ratios. Number of measurements that (be it the original number, a reduced number or even 1) that meet the limits is returned Based on the RatioStats, Pattern Probability Calculation (SPPC) outputs are determined based on a binary value for each of the defined bearing defects as to whether they are considered to be present (1=detected) or not (0) with a significant degree of confidence as compared to the standard condition monitoring alarms. Note that only the most probable of defects present will have a detection logic of 1.

A method for performing bearing defect auto-detection 400 will now be disclosed in association with FIGS. 1-4.

In a first step 410, the method provides receiving, by a processor from one or more sensors, condition monitoring data. The condition monitoring data includes vibration harmonics of at least one bearing coupled to a rotatable shaft. The bearing having an inner and an outer ring.

In a step 420, the method provides receiving the vibration data previously or sequentially transformed into the frequency domain and are ultimately provided as magnitude and frequency arrays, along with an approximate shaft speed in RPM or RPS.

In a step 430, the method provides applying a peaks determination method that determines individual peaks from background noise, and the peak true amplitudes and their exact peak center frequencies. The exact frequency and amplitude of each possible peak is stored into an array.

In a step 440, the method provides identifying all feasible whole number sub-orders of each peak up to a predefined order number including the peak itself which fall into a specific range of target fundamental frequencies ranges, one for each defined defect type and storing those peaks along with their harmonic number and their theoretical fundamental as order arrays.

In a step 450, the method provides identifying all peaks from the original list that could be feasible sidebands components of the peaks identified in step 440, having a base delta frequency within specific range of target sideband frequencies ranges, one for each defined defect type, and up to a predefined sideband+/−delta orders to determine all feasible theoretical base delta sideband frequencies and storing those feasible sideband peaks along with the sideband number, the theoretical delta sideband frequency and the center peak ID index, that fall within each of the sideband target ranges as sideband arrays.

In a step 460, the method provides identifying the peaks which have theoretical fundamental frequencies that fall within each specific target range are clustered by one or more of many methods. The theoretical fundamental frequencies with a predefined cluster dimension limit and those clusters having more than a predefined number peaks in them are organized into groups and all others as outliers. The organized groups are stored in orders arrays.

In a step 460, the method provides determining from the sideband arrays which of the sidebands are related to center frequencies components that are present in a group components array and have delta sideband frequencies within the target sideband frequency range for that group defect definition. A clustering method is applied to their base delta frequencies with a predefined cluster dimension limit and those clusters having more than a predefined number sidebands peaks in them are organized into sideband groups and all others as outliers. The sideband groups are stored in arrays with references to their respective center frequency peak from the orders arrays.

In a step 470, the method provides grouping patterns for each inner ring or outer ring bearing defect (or other defect types). Three factors for pattern construction are defined by 1) identifying the harmonics as a number of orders, 2) the number of sidebands, and 3) the fundamental frequency and mechanical frequency identifier for the sidebands, wherein a fundamental component, none or a few harmonic components, none or a few sideband components having a delta frequency other than its fundamental comprise the possible grouped patterns.

In a step 480, the method provides determining condition indicators. Here, the most feasible group can be then selected by (a) correlation with weighted pattern components, (b) presence or not of components (c) RSS of group components (d) pattern recognition method on each group.

In a step 490, the method provides identifying defects with a high confidence level. As such, the defects can be predicted with a high degree of confidence by a) most-out-of-N principle; that is for each logic test, most of the results out of a test set of N measurements must be "positive," b) by hard coding, wherein the algorithm is coded using a Compiler or Computer Resource with a Higher Level La, c) via machine learning in conjunction with the use of an Artificial Intelligence algorithm to "Learn" which defects exist.

The method further provides converting the magnitude and frequency arrays from step 410 to an Enveloped Acceleration by a data acquisition system, and/or a Hanning window is performed on the data prior to the FFT, and/or an FFT or RFT is performed on data to generate spectral data, and/or the Magnitude of the FFT data is computed from the real and imaginary spectral components, "Magnitude"=SQRT(Real2+Imag2), and/or the spectrum is truncated.

The method provides dividing each peak frequency from step 430 by number from 1 to the number of harmonics to be included in turn to determine all sub-feasible theoretical fundamental frequencies.

The method further provides subtracting each peaks' frequency identified in step 420 by every other peaks' frequencies and dividing the absolute of the result by number 1 to the number of sidebands to search for in order to identify all the feasible sideband peaks.

The method further provides optimizing the groups determined in step 460 by removing groups from a group list which are a subgroup of another group having a lower or higher fundamental frequency, such as but not limited to (a) majority of the order peaks in the group are present as orders in another group of lower fundamental frequency, (b) the peaks' orders are all multiples of either one of 2, 3 or higher, (c) a majority of the first few orders of the fundamental need to exist as peaks, typically 2 out of the first 3 or 3 out of the first 5 and so on.

The method further provides optimizing groups identifying order peaks organized from step 450 that are in more than one group. This is established by one or more probability-based rules or models assessing the relationship of the peak with respect to the other peaks in the group, which group it is most likely to be from and remove it from the other groups. The probability-based rules or models include whether: (a) the peak's specific fundamental frequency is closer to the mean of one groups fundamental frequency than the other, (b) the peak's order in one group is lower than its order in the other.

The method further provides optimizing sides by establishing if each sideband peak is also a peak present in another group by one or more probability based rules or model such as but not limited to (a) the peak is a sideband component in one group and an order component in the other (b) the peak is positioned at a lower sideband Delta frequency multiple in one group than the other, (c) the sideband peak's base Delta frequency is closer to the mean of one group than the other group, (d) the sideband peak is part of a larger cluster in one group than the other.

The method includes optimizing sides by establishing if each sideband peak within a group is likely to be genuinely linked to that group by one or more probability based rules or model such as but not limited to (a) on the presence or not of its center peak which is an order peak within the same group, (b) if Delta frequencies of the sideband group are all multiples the base Delta frequency of either one of 2, 3 or higher, then the sidebands belong to another base delta frequency, and if out of the defined sideband range or not deemed probable, remove the sideband peaks from the group.

The method further provides selecting only the group from step 450 having the (a) most peaks and/or (b) the narrowest cluster dimension (tolerance) and/or (c) best harmonic peak presence pattern, as the most probable symptom related to that defined defect type and is stored as arrays of group components The method provides selecting only the sideband group from step 460 having the (a) most peaks and/or (b) the narrowest cluster dimension (tolerance) and/or (c) best sideband peak presence pattern as being representative of the most probable sidebands related to that specific defined defect type and is stored as arrays of sideband components associated with that specific group.

The method includes applying a noise carpet filter to filter noise from of the frequency spectrum to remove unwanted spectral noise is accomplished by keeping only those components +10 dB above the local spectral carpet level. All others are reduced to zeroes.

The method further provides identifying the peaks from the noise filtered spectrum and then performing a quadratic peak interpolation on the unfiltered spectrum. This identifies the exact frequency as orders of presumed shaft speed and amplitude of each possible peak and then stores them into an array. The result creates normalized arrays of Peak Frequencies and Peak Amplitudes.

The method includes removing known mechanical frequency peaks using a module leaving a set of frequencies that include the bearing defect frequency components such as the inner and outer ring of the bearing. The mechanical peaks result from a test fixture such as shaft speed rather than the bearing. A "Funds in Band" sub-algorithm is called twice to select array peaks that could have a sub-order and hence a theoretical fundamental frequency within a specified frequency band.

The method provides determining with the funds in band sub-algorithm if each peak itself or an exact sub-order of it falls within the frequency range of fundamental frequencies of interest (FunL→FunH) creating a new array of fundamentals, harmonic number and original indices. Those with their fundamentals that group together within a prespecified or learn tolerances are grouped as "orders" for that specific fundamental. Then a Sides in Band function is applied and for the selected group(s) for each order in that group each possible peak in the original array is checked to see if its delta-frequency wrt that order is or has a sub-order within the sideband range.

The method includes associating which frequency members belong within a frequency group with a clustering orders sub-algorithm. Here, a dimensional cluster method performs removal of outsiders from the group. The groupings by specific tolerances can be achieved by (i) histograms of reducing bin sizes for one or more groups, (ii) clustering of reducing size by removal of outsiders for a single group, (iii) multiple clusters for multiple groups. The outputs of Clusterorders and/or Remove-Subs sub-algorithms are arrays of individual order components sorted into identifiable groups(s).

The method provides that a search range for the fundamental is for a first iteration centered around the expected frequency of a known mechanical vibration component and utilizing a low number of harmonics. Then by clustering the results the most feasible cluster is used to calculate a significantly narrower search range and the number of harmonics increased for a second iteration, from which with or without the option of further clustering the identified peaks are removed from the peaks arrays prior to iterating claim 1 for defect frequencies.

The method further provides a test for an ignore sides function that includes:
 a.) the group has at least 2 "first" sideband components, and/or
 b.) the group has at least 1 "first" sideband component AND 2 "second" sideband components. Here, the outputs of ClusterSides and/or IgnoreSides functions are arrays of individual sideband components sorted into the same group(s) of the order component which is their "center-frequency.

The method also including weighting each component from step 470 in the pattern according to two sets of weighting coefficients; one for the harmonics (orders) and one for the sidebands statistically derived as to determine the most probable defect type. These weightings are static algorithm parameters.

The method providing confirming with high degree of confidence that a bearing defect is present or not with the Most-out-of-N principle that is a probabilistic sub-algorithm whether a bearing defect is present or not. The required measurement values/parameters for the latest N measurements comprise:
 Bearing Defect Frequency Types,
 Bearing Defect Frequency Value 1 to N,
 Bearing Defect Fundamental Frequency Value 1 to N,
 Bearing Defect Sideband Frequency Value 1 to N, and
 Rotations per Minute 1 to N.

The present invention may be a system, a method, and/or a computer program product at any possible technical detail level of integration. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for performing bearing defect auto-detection comprising:
   providing a wheel rail set comprising a rotatable shaft and at least one bearing,
   positioning at least one vibration sensor on the at least one bearing, the at least one bearing having an inner ring and an outer ring,
   measuring vibrations of the wheel rail set in motion by the at least one vibration sensor, the measured vibrations providing vibration data,
   sending the vibration data from the at least one vibration sensor to a processor, the vibration data including vibration harmonics of the at least one bearing; wherein the at least one bearing is coupled to the rotatable shaft, the method further including;
   a) transforming the vibration data via the processor into the frequency domain, the transformed vibration data being provided as magnitude and frequency arrays, along with an approximate shaft speed in revolutions per minute (RPM) or revolutions per second (RPS),
   b) applying a peaks determination method to the transformed vibration data that determines individual peaks from background noise, the peak true amplitudes and their exact peak center frequencies being determined, wherein the exact frequency and amplitude of each possible peak is stored into a peaks determination array,
   c) identifying whole number sub-orders of each peak up to a predefined order number including any peak that falls into a predetermined range of target fundamental frequencies ranges, wherein each peak has a defined defect type and stores those peaks along with a harmonic number and theoretical fundamental frequencies as a frequency array,
   d) clustering the theoretical fundamental frequencies that fall within the predetermined range of target fundamental frequencies ranges, clustered theoretical fundamental frequencies being within a predefined cluster dimension limit, the predefined cluster dimension limit being defined by a number peaks in the theoretical fundamental frequencies, the clustered theoretical fundamental frequencies forming the tightest cluster dimensions are organized into groups and all others as outliers, and the groups stored in cluster arrays, and
   e) Identifying all peaks from the peaks determination array that could be sidebands components of the peaks identified in step (d), having a base delta frequency within a predetermined range of target sideband frequencies ranges, wherein each peak represents a corresponding defined defect type, and up to a predefined sideband+/−delta orders to determine all theoretical base delta sideband frequencies and storing those sideband peaks along with the sideband number, the theoretical delta sideband frequency and the center peak ID index, that fall within each of the sideband target ranges as sideband arrays, and f) clustering the base delta frequencies of the sideband components within a predefined cluster dimension limit, the predefined cluster dimension limit being defined by a number peaks in the base delta frequencies, the clustered base delta frequencies forming the smallest cluster dimensions are organized into sideband groups and all others as outliers, and the sideband groups stored in arrays with references to each respective center frequency peak from an orders array.

2. The method for performing bearing defect auto-detection according to claim 1, further comprising grouping patterns for the corresponding defined defect type of the inner ring and the outer ring of the bearing defect, wherein the grouping patterns are constructed according to three factors: 1) identifying the harmonics as a number of orders, 2) the number of sidebands, and 3) the fundamental frequency range and frequency range for the sidebands.

3. The method for performing bearing defect auto-detection according to claim 1, further comprising determining condition indicators, wherein determining a feasible group can then be selected by; (a) correlation with weighted pattern cluster arrays, (b) presence of cluster arrays, (c) Root Sum Squared value (RSS) of group cluster arrays (d) a pattern recognition method on each of the clustered theoretical fundamental frequencies.

4. The method for performing bearing defect auto-detection according to claim 1, further comprising identifying defects with a high confidence level, wherein defects can be predicted with a high degree of confidence by Most-out-of-N (MooN) principle, the MooN principle uses a logic test, wherein each logic test containing an amount of measurements, denoted as N, that must have majority of positive results, where the MooN logic parameters are defined by a) an experienced analyst, b) by Design of Experiment (DOE) on known data, c) via machine learning, wherein the use of an Artificial Intelligence algorithm to learn the parameters, to identify which defects exist.

5. The method according to claim 1, wherein the magnitude and frequency arrays are converted to an Enveloped Acceleration by a data acquisition system, a Hanning window is performed on the magnitude and frequency arrays prior to a Fast Fourier Transformation, the Fast Fourier Transformation or a Ramanuj an Fourier Transformation is performed on magnitude and frequency arrays to generate spectral data, the Magnitude of the FFT data is computed from the real and imaginary spectral components, Magnitude=SQRT(Real2+Imag2), a spectrum is truncated.

6. The method according to claim 1, further comprising dividing each peak that fall into the predetermined range of target fundamental frequencies range at step c) by number from 1 to the number of harmonics to be included in turn to determine a set of theoretical fundamental frequencies.

7. The method according to claim 1, further comprising subtracting each individual peaks center frequency identified in step b) by every other individual peaks center frequencies in turn and dividing the absolute of the result by number 1 to a number of sidebands to search for to identify all sideband peaks.

8. The method according to claim 1, further comprising optimizing clustered fundamental theoretical fundamental frequencies by applying a method to remove clustered fundamental theoretical fundamental frequencies from the cluster arrays which are a sub-cluster of fundamental theoretical fundamental frequencies of another clustered fundamental theoretical fundamental frequencies having a lower or higher fundamental frequency, selected from the group consisting of (a) majority of the order peaks in the group are present as orders in another group of lower fundamental frequency, (b) the peaks' orders are all multiples of either one of 2, 3 or higher, and (c) a majority of the first few orders of the fundamental need to exist as peaks typically 2 out of the first 3 or 3 out of the first 5 and so on.

9. The method according to claim 1, further comprising optimizing clustered fundamental theoretical fundamental frequencies by applying a method to identify order peaks that are in more than one clustered fundamental theoretical fundamental frequencies, using one or more probability based rules or model to assess the relationship of a peak with respect to other peaks in the clustered fundamental theoretical fundamental frequencies, identifying which clustered fundamental theoretical fundamental frequencies the peak is most likely to be from and removing the peak from the other clustered fundamental theoretical fundamental frequencies, wherein the identifying and removing step is selected from the group consisting of assessing (a) the peak's specific fundamental frequency is closer to the mean of one groups fundamental frequency than the other, and (b) the peak's order in one group is lower than in a different group.

10. The method according to claim 1, further comprising optimizing the sideband groups by applying a method to establish if each sideband peak is also a peak present in another sideband group by one or more probability based rules or model selected from the group consisting of (a) the peak is a sideband component in one sideband group and an order component in the other (b) the peak is positioned at a lower sideband Delta frequency multiple in one sideband group than the other, (c) the sideband peak's base Delta frequency is closer to the mean of one sideband group than the other group, and (d) the sideband peak is part of a larger cluster in one sideband group than another sideband group.

11. The method according to claim 1, further comprising optimizing the sideband groups by applying a method to establish if each sideband peak within a sideband group is linked to that sideband group by one or more probability based rules or model selected from the group consisting of (a) on the presence or not of its center peak which is an order peak within the same sideband group, and (b) if Delta frequencies of the sideband group are all multiples the base Delta frequency of either one of 2, 3 or higher, then the sidebands belong to another base delta frequency and if outside of the defined sideband range or not deemed probable remove the sideband peaks from the sideband group.

12. The method according to claim 1, further comprising selecting only the group having the (a) most peaks (b) the narrowest cluster dimension (c) harmonic peak presence pattern as determined by the experienced analyst, is selected as being representative of the most probable symptom related to the corresponding defined defect type and is stored as arrays of group components.

13. The method according to claim 1, further comprising selecting only the sideband group having the (a) most peaks (b) the narrowest cluster dimension (c) the sideband peak presence pattern as determined by the experienced analyst, is selected as being representative of the most probable sidebands related to the corresponding defined defect and is stored as arrays of sideband components associated with that specific sideband group.

14. The method according to claim 1, further comprising applying a noise carpet filter to filter noise from a frequency spectrum to remove spectral noise reducing any components +10 dB below a local spectral carpet level, to zeroes.

15. The method according to claim 1, further comprising identifying the peaks from a noise filtered spectrum of the clustered theoretical fundamental frequencies and then a quadratic peak interpolation method is performed on an unfiltered spectrum, and it identifies the exact frequency as orders of presumed shaft speed and amplitude of each possible peak of the clustered theoretical fundamental frequencies and stores them into a noise filtered frequencies array to create normalized arrays of Peak Frequencies and Peak Amplitudes.

16. The method according to claim 1, further comprising removing known mechanical frequency peaks using a module leaving a set of frequencies that include a bearing defect frequency components such as the inner and outer ring of the bearing, wherein mechanical peaks result from the test fixture, selected from the group consisting of shaft speed rather than the bearing, and wherein a fundamental frequencies in band sub-algorithm is called at least once in sequence to select array peaks that could have a sub-order and hence have a harmonic with a frequency within a specified frequency band.

17. The method according to claim 16, further comprising with the fundamental frequencies in band function if each peak itself or an exact sub-order of it falls within the frequency range of fundamental frequencies of interest creating a new array of fundamental frequencies and harmonic number, wherein selected peaks with their fundamental frequencies that are grouped together by the fundamental frequencies in band function within a prespecified or learn tolerances are grouped as orders for that specific fundamental; the method further includes a sideband function is applied to the selected group(s) for each order in that group the selected peaks in the peaks determination array is checked to see if its delta-frequency is or has a sub-order within the sideband range.

18. The method according to claim 1, further comprising determining learned tolerances using artificial intelligence.

19. The method according to claim 1, wherein the method includes associating frequency members, belonging within a frequency group, with a clustering orders sub-algorithm,
   wherein a dimensional cluster method removes outsiders from the frequency group,
   wherein specific tolerances of the frequency group can be achieved by (i) histograms of reducing bin sizes for one or more groups, (ii) clustering of reducing size by removal of outsiders for a single group, (iii) multiple clusters for multiple groups, and wherein the outputs of Clusterorders or Remove-Subs sub-algorithms are arrays of individual order components sorted into identifiable groups(s).

20. The method according to claim 16, wherein a search range for the mechanical fundamental frequency is for a first iteration centered around an expected mechanical fundamental frequency of a known mechanical vibration component and utilizing a low number of harmonics as determined by the experienced analyst, then by clustering the results the determined cluster is used to calculate a reduced search range and the number of harmonics increased for a second iteration, from which with or without the option of further clustering the identified mechanical fundamental frequency peaks are removed from the mechanical fundamental frequency peaks arrays prior to iterating claim 1 for defect frequencies.

21. The method according to claim 1, wherein a test for ignoring sideband groups includes
   a) a group has at least 2 first sideband components, b) the group has at least 1 first sideband component AND 2 second sideband components, and wherein outputs of ClusterSides or IgnoreSides functions are arrays of individual sideband components sorted into the same sideband group(s) of the order component which is their center-frequency.

22. The method according to claim 3, wherein each component in a pattern is weighted according to two sets of weighting coefficients; the first set of the two sets of weighting coefficients is for harmonics and the second set of the two sets of weighting coefficients is for sidebands, wherein the first set or the second set is statistically derived as to determine a defect type, and wherein these weightings are static algorithm parameters.

23. The method according to claim 4, wherein the Most-out-of-N principle is a probabilistic sub-algorithm that is used to confirm that a bearing defect is present or not, wherein a required measurement values/parameters for most recent N measurements comprise 1) Bearing Defect Frequency Types, 2) Bearing Defect Frequency Value 1 to N, 3) Bearing Defect Fundamental Frequency Value 1 to N, 4) Bearing Defect Sideband Frequency Value 1 to N, and 5) Rotations per Minute 1 to N.

* * * * *